April 15, 1969     C. W. CHESTER     3,438,281
SIDE VIEW MIRROR
Filed Dec. 18, 1967
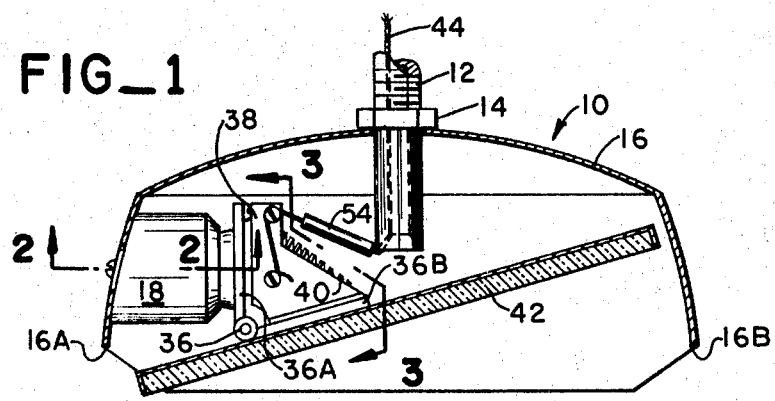
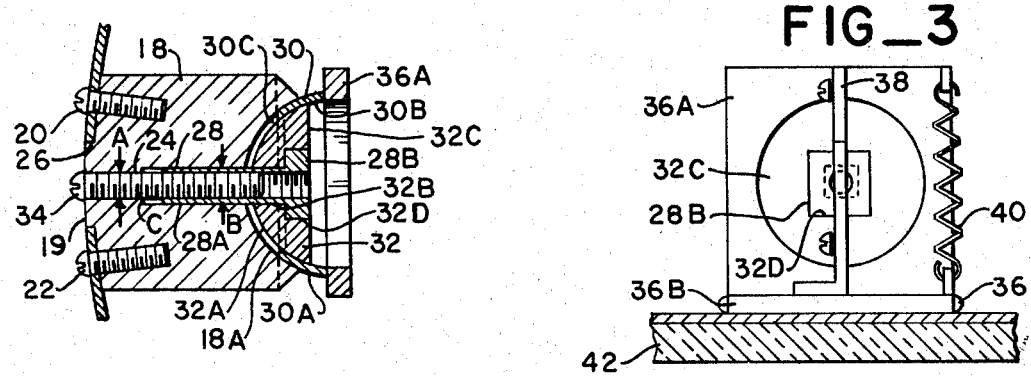
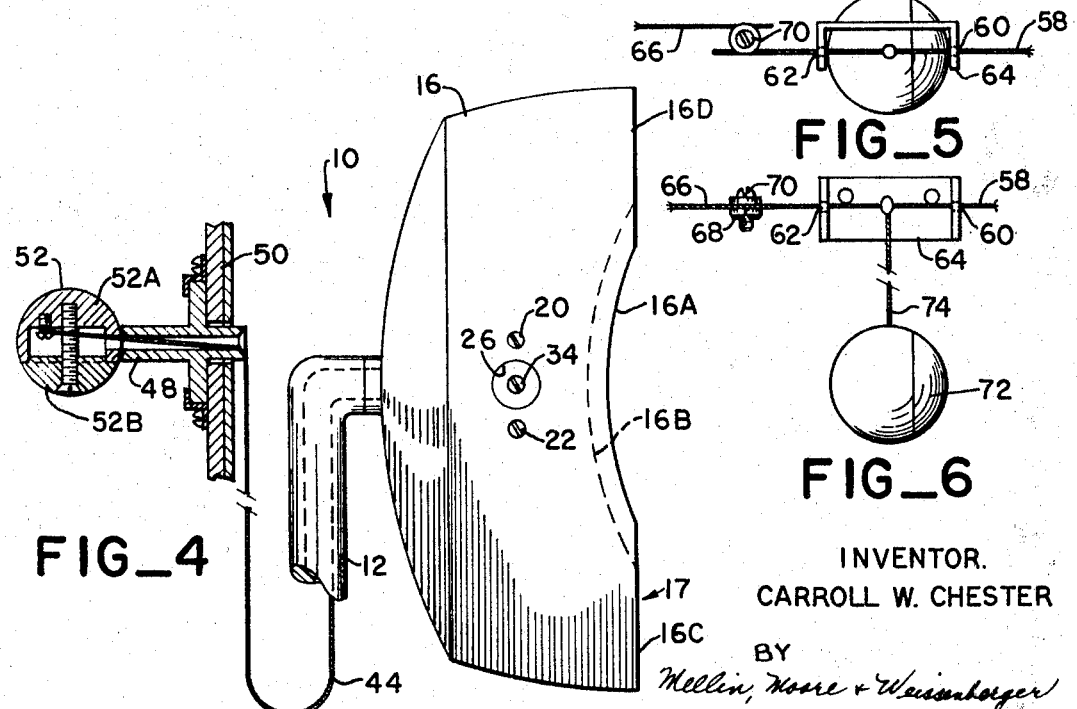
INVENTOR.
CARROLL W. CHESTER
BY
Mellin, Moore & Weisenberger
ATTORNEYS

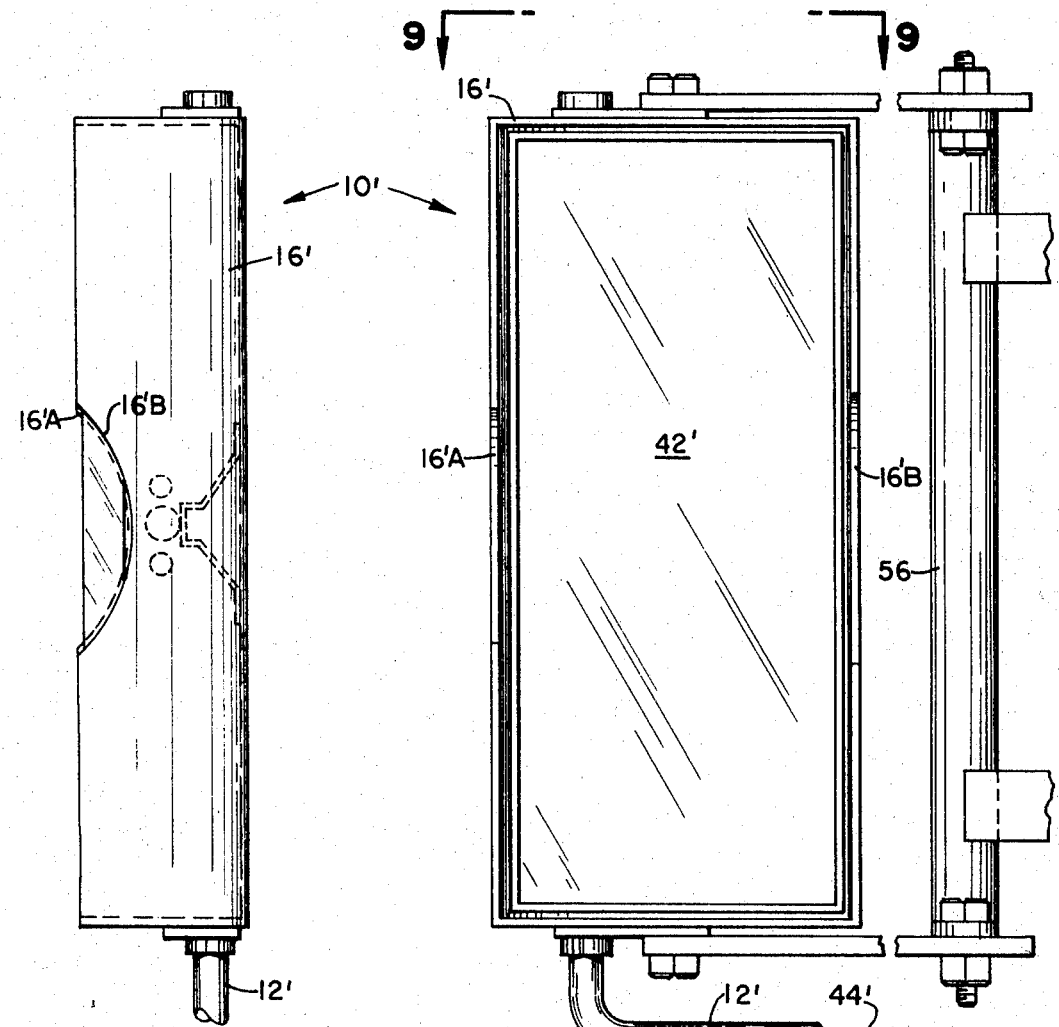
FIG_7
FIG_8
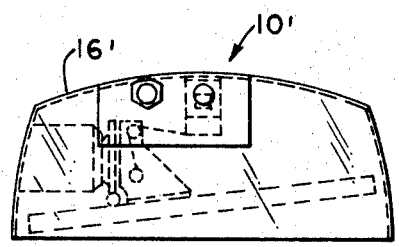
FIG_9

United States Patent Office 3,438,281
Patented Apr. 15, 1969

3,438,281
SIDE VIEW MIRROR
Carroll W. Chester, 1932 E. 76th Place,
Los Angeles, Calif. 90001
Filed Dec. 18, 1967, Ser. No. 691,261
Int. Cl. F16c 1/22
U.S. Cl. 74—501                     11 Claims

ABSTRACT OF THE DISCLOSURE

A right-and-left reversible mirror assembly in which the mirror is resiliently movable, having a support tube, a shell, a mirror hingedly mounted to the shell, and a cable passing through the support tube and adapted to hingedly move the mirror when pulled, the assembly including a spring adapted to return the mirror to its original position when the cable is released.

Background of the invention

This invention relates to a mirror assembly, and more particularly to a mirror assembly in which the mirror is movable by remote means against a resilient bias.

Side-view mirrors which can be adjusted from one fixed position to another from the inside of the vehicle are well known. However, in addition to a permanent adjustment, it is at times desirable to temporarily adjust a side-view mirror to see objects normally outside its field of view and to then return it to its permanent position. Such a temporary adjustment should, of course, be made from inside the vehicle. The requirement arises because side-view mirrors, by their nature, have a relatively limited field of view to present to the driver. This problem is particularly pronounced on the passenger side of the vehicle. With most conventional non-resiliently adjustable mirrors, it is not practical to sweep a side-view mirror through a range of angles because any movement of the mirror away from its reference position destroys the reference, and the reference or home position has to be re-established by hand, causing distraction to the driver. A control for varying the position of the mirror from inside the vehicle to selectively vary and thus increase the field of vision, with the mirror returning to its pre-adjusted home position upon release of the control, would therefore be desirable.

A number of mirror assemblies which provide means for remote adjustment thereto are known (see, for example, Gosling 3,198,071, Walsh 3,096,664, Kawecki 3,046,841, Jacobson 2,931,245, and Jacobson 3,030,-821). Each of these devices, however, uses a mirror pivotal relative to a shell which holds it on a ball-and-socket joint, in combination with multiple sheathed cables which are moved within the shell to provide such pivotal movement. Because of the substantial friction in the ball-and-socket joint which is necessary to hold the mirror in any position to which it is moved, and because of the plurality of cables within these sheaths which are necessary to move the mirror in opposite directions, each of these devices has been found relatively erratic and unsmooth in operation. Furthermore, a study of these patents reveals that the devices disclosed therein are relatively complicated in construction; and of course they do not have the capability of automatically returning the mirror to a pre-set reference position.

It is an object of this invention to overcome the above problems by providing a mirror assembly the mirror of which is resiliently movable away from a pre-adjustable reference position from within the vehicle to which it is mounted, the mirror assembly meanwhile being efficient in operation and simple in design.

It is a further object of this invention to provide a mirror assembly which can be mounted on either side of a vehicle with only minor adjustment being made to the structure thereof.

Summary of the invention

Broadly stated, the mirror assembly mountable on a vehicle comprises a support member and a shell fixed to the support member. Included is a hinge having first and second leaves, the first leaf being held relative to the shell, the second leaf being hingedly movable in both directions relative to the first leaf. A mirror is fixed to the second leaf, whereby it is hingedly movable relative to the shell. Means are included for resiliently urging the second leaf in one direction relative to the first leaf. First limit means are included for limiting the movement of the second leaf relative to the first leaf in the one direction under the resilient urging means. Control means are also included for moving the second leaf in the other direction relative to the first leaf, and second limit means are included for limiting the movement of the second leaf in the other direction, whereby a predetermined degree of resilient movement of the mirror relative to the shell is obtained.

Brief description of the drawings

Other features and objects of the invention will become apparent from a study of the following specification, taken in connection with the accompanying drawings, in which:

FIG. 1 is a plan view, partially in section of a first embodiment of a mirror assembly according to the invention;

FIG. 2 is a sectional view taken along the line 2—2 of FIG. 1;

FIG. 3 is a view taken along the line 3—3 of FIG. 1;

FIG. 4 is a side elevation of the mirror assembly in combination with a sectional view of a pull ball assembly;

FIG. 5 is a side elevation of another pull ball assembly;

FIG. 6 is a plan view of the pull ball assembly of FIG. 5;

FIG. 7 is a side elevation of another embodiment of the mirror assembly;

FIG. 8 is a front elevation of the mirror assembly shown in FIG. 7;

FIG. 9 is an elevation taken along the line 9—9 of FIG. 8.

Description of the preferred embodiment

Referring to the drawings, a mirror assembly 10 is generally shown in FIG. 1. Included in the assembly 10 is a support member 12 of which one end (not shown) is mountable on a vehicle. Fixed to the support member 12 by means of locknut 14 thereon is a shell 16. The shell 16 has a substantially circular periphery, and the support member 12 and shell 16 are disposed so that the plane of the edge of the shell 16 is substantially perpendicular to the longitudinal axis of the vehicle on which the assembly 10 is installed.

As shown in FIGS. 1 and 2, a support member 18 is affixed to the inside of the shell 16 as by bolts 20 and 22. Support member 18 has a protrusion 19 thereon which fits into an aperture 26 in the shell 16. Aperture 24 has a portion A of circular cross section and a portion B of square cross section. A radial portion C interconnects these two portions. A sleeve 28 having a body 28A of square cross section slidably fits into the aperture 24. Support member 18 has a spherically concave portion 18A into which fits a spherically convex portion 30A of a member 30. The member 30 is hollow, having a spherically concave portion 30B therein, and has a large aperture 30C therethrough. Engaging with the spherically concave portion 30B is a spherically convex portion 32A of a member 32. Member 32 has an aperture 32B therein and a flat surface portion 32C. Sleeve 28 has a square head 28B thereon which seats in a square seat 32D formed on the flat portion 32C of member 32. The sleeve 28 is thus not rotatable relative to member 32.

Threaded into the sleeve 28 is a bolt 34, the head of the bolt 34 being accessible from without the shell 16. Fixed to the member 30 is a leaf 36A of a hinge 36. It will be seen that the disposition of the leaf 36A relative to the shell 16 may be changed by turning bolt 34 to withdraw it from sleeve 28, so that member 30 is not gripped by spherically concave portion 18A and spherically convex portion 32A. The leaf 36A may thus be pivotally moved relative to the support member 18 and then held in place by tightening bolt 34. Spherically convex portion 30A and spherically concave portion 18A form a ball-and-socket joint.

The leaf 36B of hinge 36 is movable in both directions relative to the leaf 36A. As seen in FIG. 1, an arm 38, fixed to leaf 36B, limits the movement of leaf 36B toward leaf 36A by bearing on leaf 36A. Spring member 40, interconnecting leaves 36A and 36B, urges the leaf 36B in that direction. Fixed to the leaf 36B is a mirror 42. The mirror 42 is thus hingedly movable relative to leaf 36A. One end of a cable 44 is fixed to the arm 38. This cable 44 then passes within and through the support member 12, and through a tubular member 48 mounted in a panel 50 within the vehicle. The other end of the cable 44 is fixed within a ball 52, which is made up of two parts 52A and 52B bolted together. A substantially incompressible tube 54 is disposed about the cable 44 between its end fixed to arm 38 and its portion within the support member 12.

In the operation of the mirror assembly 10, the support member 12 is mounted on a vehicle so that the shell is substantially perpendicular to the longitudinal axis of the vehicle. The cable 44 is led from the support member 12 through the tubular member 48 mounted on an interior panel 50, and the ball 52 attached thereto with the cable 44 being taut between the arm 38 and the ball 52. The reference mirror position may be varied by means of the bolt 34 and ball-and-socket structure described previously. This adjustment allows the use of the same mirror on either the right or the left side of the vehicle with consequently widely varying reference position angles. It will be noted that the mirror 42 is in a relatively well protected position, i.e., an accidental blow on the shell will not alter the set mirror position. This is so because the mirror 42 moves inside the shell 16, the shell 16 in turn being fixed to the support member 12.

The mirror 42 is limited in its movement toward leaf 36A of hinge 36 by the arm 38 contacting that leaf 36A, and is normally held in such position by spring member 40. After bolt 34 is tightened, therefore, the mirror is held in its reference position relative to the shell 16. If it is desired to move the mirror 42, thereby increasing the field of view available to the driver of the vehicle, ball 52, on panel 50, is pulled, and cable 44, being substantially taut, acts on arm 38, moving leaf 38B and mirror 42 with it. The amount of movement of the mirror 42 is limited by the engagement of spacer tube 54 with arm 38 and support member 12. The range of resilient movement of mirror 42 can be varied by substituting spacer tubes of different lengths. If it is desired that the mirror 42 be moved back to its original or reference position, the ball 52 need only be released, and spring member 40 will act to so move it.

In FIGS. 7, 8 and 9 is shown a second embodiment of the assembly 10′ which is particularly suitable for use on trucks. This assembly 10′ has a shell 16′, mirror 42′ and operating structure similar to the previous embodiment. However, member 12′ is not a support member, and other support means 56 are included.

It will be noted that, because of the construction of the embodiments 10 and 10′, either assembly may be operably mounted on either side of the vehicle, the first embodiment by rotating the shell 180° about the axis of the support member 12 when it is attached thereto, and the second embodiment by reversing the ends of the shell 16′.

If a pair of mirror assemblies are used, they may be operated simultaneously if desired by means shown in FIGS. 5 and 6. A cable 58 is passed through a pair of apertures 60, 62 in a U-shaped member 64, which is mounted to a panel within the vehicle. Cable 58 is joined to a cable 66 by means of a nut 68 and bolt 70. Each of these cables runs to a mirror assembly 10. A ball 72 is attached to cable 58 by means of a cable 74. It will be seen that, by pulling on ball 72, both mirror assemblies may be made to operate simultaneously.

It will be noted that the outer periphery 17 of shell 16 defines oppositely spaced coplanar portions 16C, 16D, a concave portion or indentation 16A interconnecting portions 16C and 16D, and a concave portion or indentation 16B which extends deeper than concave portion 16A relative to the plane, and interconnects portions 16C and 16D opposite concave portion 16A. This structure allows the deeper indention 16B to be nearer the driver of the vehicle if the assembly 10 is mounted on the opposite side of the vehicle as described above. The shallower indentation 16A will be outward of the driver of the vehicle, where, while being sufficiently deep to allow proper viewing when the mirror 42 is moved by means of cable 44, still affords protection to the mirror 42 from rain, wind, sleet or snow.

Indentations 16′A and 16′B are included in shell 16′, which operates in the same way as shell 16.

It will be seen that herein is provided a mirror assembly having a mirror which is resiliently adjustable through a predetermined arc from a pre-settable reference position from within the vehicle to which it is mounted. It will further be seen that the device disclosed herein is versatile in installation, extremely simple in design, and efficient in operation. Obviously, the invention can be carried out in many different ways, and the embodiment shown and described herein is merely illustrative. Consequently, I do not desire to be limited by the embodiment shown and described, but only by the scope of the following claims.

I claim:
1. A mirror assembly comprising:
 (a) support means;
 (b) mirror means mounted on the support means for movement relative thereto;
 (c) means for urging the mirror in one direction relative to the support means;
 (d) means for limiting the movement of the mirror in the one direction to determine a reference position;
 (e) selectively releasable means for moving the mirror means from its reference position in another direction against the urging means, the urging means moving the mirror means to the reference position when the releasable means are selectively released.

2. A mirror assembly according to claim 1, wherein is further included means for limiting the movement of the mirror in said other direction.

3. A mirror assembly according to claim 2, wherein the means for limiting the movement of the mirror in said one direction and in said other direction are disposed within the support means.

4. A mirror assembly mountable on a vehicle, comprising:
 (a) a support member;
 (b) a shell fixed to the support member;
 (c) a hinge having first and second leaves, the first leaf being held relative to the shell, the second leaf being hingedly movable in both directions relative to the first leaf;
(d) a mirror fixed to the second leaf, whereby the mirror is hingedly movable relative to the shell;
(e) means for resiliently urging the second leaf in one direction relative to the first leaf;
(f) means for limiting the movement of the second leaf relative to the first leaf in said one direction under said resilient urging means;
(g) means for moving the second leaf in the other direction relative to the first leaf; and
(h) means for limiting the movement of the second leaf in said other direction, whereby a degree of movement of the mirror relative to the shell is obtained.

5. A mirror assembly according to claim 4, wherein are included means for pivotally mounting the hinge to the shell.

6. A mirror assembly according to claim 5, wherein the means for pivotally mounting the hinge to the shell comprises a ball held relative to one of the shell or first leaf, and a socket in which said ball fits, said socket being held relative to the other of the shell and first leaf.

7. A mirror assembly according to claim 4, wherein the means for moving the second leaf in the other direction relative to the first leaf comprises a cable passing within and through the support member, one end of said cable being held relative to the second leaf, the other end of said cable being accessible from without the support member, whereby pulling of the accessible end of the cable moves the second leaf in the other direction relative to the first leaf.

8. A mirror assembly according to claim 7, wherein is included an arm fixed to the second leaf and to which the one end of said cable is fixed, whereby the one end of cable is held relative to the second leaf, and wherein the means for limiting the movement of the second leaf in said other direction comprises a tube disposed about the cable between its end fixed to the arm and its portion within the support member, the tube being substantially incompressible between the arm and the support member.

9. A mirror assembly according to claim 8, wherein the means for resiliently urging the second leaf in one direction relative to the first leaf comprises a spring.

10. A mirror assembly according to claim 4 wherein the outer periphery of the shell defines first and second spaced coplanar portions, a first concave portion interconnecting the first and second spaced coplanar portions and a second concave portion extending to a depth greater than the first concave portion relative to the plane and interconnecting the first and second spaced coplanar portions opposite the first concave portion.

11. A device for simultaneously operating a pair of side view mirrors on a vehicle, each having a pull cable which provides adjustment thereto respectively, comprising:
(a) means for attaching one cable to the other to provide a continuous cable means;
(b) a first upright member fixed relative to the vehicle and having an aperture therein through which the cable means passes;
(c) a second upright member fixed relative to the vehicle adjacent but spaced from the first upright member and having an aperture therein through which the cable means passes;
(d) means intermediate the first and second upright members for urging the cable means in a direction transverse thereto, whereby the pair of side view mirrors may be simultaneously operated.

References Cited
UNITED STATES PATENTS

| | | | |
|---|---|---|---|
| 2,696,142 | 12/1954 | Langford | 74—501 |
| 2,758,508 | 8/1956 | Petri et al. | 74—501 |
| 2,903,944 | 9/1959 | Cooper | 74—501 |
| 2,906,292 | 9/1959 | Mayo | 74—501 |
| 3,407,683 | 10/1968 | Liedel | 74—501 |

FRED C. MATTERN, JR., *Primary Examiner.*

W. S. RATLIFF, JR., *Assistant Examiner.*